R. J. HERRICK.

STAPLE RETAINER.

APPLICATION FILED DEC. 14, 1911.

Reissued Dec. 10, 1912.

13,494.

WITNESSES

F. C. Barry

W. A. Schmidt

INVENTOR

Reuben J. Herrick

BY Wilson B. Stevens Esq.

Attorneys

UNITED STATES PATENT OFFICE.

REUBEN J. HERRICK, OF CARLINVILLE, ILLINOIS.

STAPLE-RETAINER.

13,494. Specification of Reissued Letters Patent. Reissued Dec. 10, 1912.

Original No. 993,991, dated May 30, 1911, Serial No. 583,465. Application for reissue filed December 14, 1911. Serial No. 665,867.

*To all whom it may concern:*

Be it known that I, REUBEN J. HERRICK, a citizen of the United States, residing at Carlinville, in the county of Macoupin and State of Illinois, have invented certain new and useful Improvements in Staple-Retainers, of which the following is a specification.

This invention relates to devices for holding the staples which are employed for securing the line wires of fences, the device being more particularly adapted for application to concrete or artificial stone fence posts.

The invention has for its object to provide a simple and efficient holding device of the kind stated, which is embedded in the post during the process of its manufacture, and which device consists in a novel construction and arrangement of parts, and possesses certain advantages, as will be hereinafter described.

Figure 2:
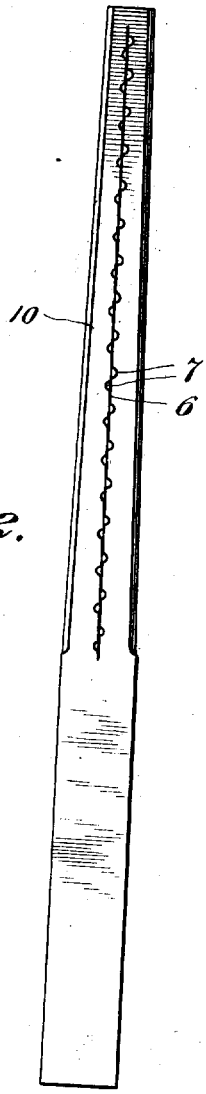
Figure 1:
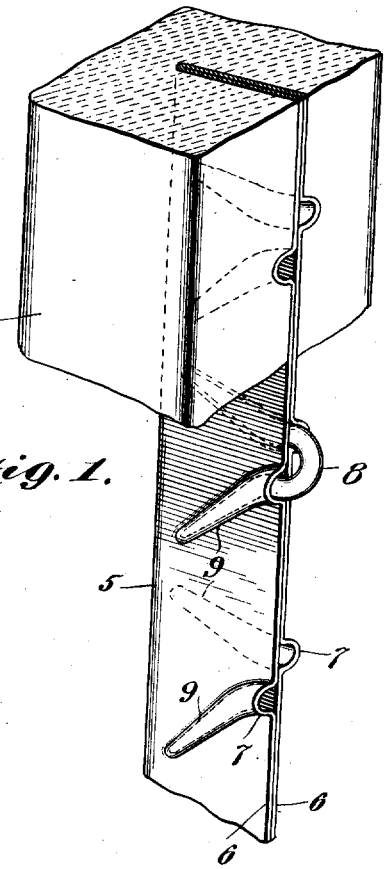

In the accompanying drawing, forming a part of this specification, Figure 1 is a perspective view of a fragment of the holding device and one of the staples in position, the fence post to which the device is applied being shown partly broken away. Fig. 2 is a front elevation of a fence post showing the position of the device thereon.

Referring specifically to the drawing, the retaining device comprises a single strip of suitable sheet metal which is doubled over by being bent at its longitudinal median line, as indicated at 5. The two parts 6 of the strip are stamped or pressed to come closely together, and each is formed with transverse corrugations 7 which form openings between the parts 6 to receive the prongs of the staple 8.

The corrugations 7 of the respective parts 6 are staggered, and their convex portions are on the outer sides thereof, the concave portions of the corrugations of one of the parts 6 being covered by the other part 6. The corrugations of the respective parts are also arranged in pairs, the members thereof being spaced apart a distance to correspond to the space between the prongs of the staple.

The corrugations are directed inwardly from the longitudinal free edges of the parts 6, and they extend transversely of the latter, and stop some distance from the bend 5. The corrugations extend straight across the parts for a portion of their length and are then deflected laterally, as indicated at 9, the members of the pairs being thus deflected in opposite directions, so that when the staple is driven, its prongs will be spread.

The device herein described is simple in construction, and can therefore be cheaply manufactured. It can be readily placed in the post 10 by being pushed down in the concrete mixture while it is still in a green state, leaving its edge, which shows the openings formed by the corrugations, flush with the face of the post. After the post hardens, the staples can be driven into the openings. Any ordinary fence staple can be used, no specially constructed staple being required. Inasmuch as the device is made in one piece, it is rigid and firm, and the corrugations also serve to retain it in place within the post. The staples upon being driven follow the straight portions of the corrugations, and upon entering the deflected portions are spread in opposite directions, whereby they are firmly held in place. The position of the corrugations of one of the parts with respect to the adjacent corrugation of the other part is such that the staple is driven into the post obliquely.

I claim:

1. A staple retainer comprising a strip which is doubled over, the two portions of the strip having transverse corrugations extending from their free edges, and the corrugations of the respective portions of the strip being arranged in pairs to receive the prongs of the staple, and the members of said pairs being obliquely spaced with respect to the edges of the strips.

2. A staple retainer comprising a pair of contiguous strips having transverse corrugations extending from one of their edges, the corrugations of the respective strips being arranged in pairs to receive the prongs of the staple, and the members of said pairs being obliquely spaced with respect to the edges of the strips.

3. A staple retainer comprising a pair of contiguous strips having transverse corrugations extending from one of their edges, the corrugations of the respective strips being arranged in pairs to receive the prongs of the staple, and the members of said pairs of corrugations being obliquely spaced with respect to the edges of the strip, and having laterally deflected portions in opposite directions to spread said prongs of the staple.

4. A staple retainer comprising a pair of contiguous strips having transverse corrugations extending from one of their edges, the convex portions of the corrugations being on the outside of the respective strips, the concave portions of the corrugations of one strip being covered by the straight portion of the other strip, and said corrugations of the respective strips being arranged in pairs to receive the prongs of the staple.

5. A staple retainer comprising a metallic strip folded upon itself, the opposite side parts of the strip being provided along their edges with a series of corrugations which extend inwardly toward the fold of the strip, said corrugations throughout the series being arranged in pairs and the members of said pairs diverging inwardly, the inner surfaces of the opposite side parts of the strip except at the lines where the corrugations occur lying in parallel planes and in close contact with each other throughout their entire areas.

In testimony whereof I affix my signature in the presence of two witnesses.

REUBEN J. HERRICK.

Witnesses:

L. P. PEEBLES,

M. J. BOEHM.

Copies of this patent may be obtained for five cents each, by addressing the "Commissioner of Patents, Washington, D. C."